(12) United States Patent
Liu et al.

(10) Patent No.: US 9,369,849 B2
(45) Date of Patent: Jun. 14, 2016

(54) THREE-DIMENSIONAL BEAMFORMING IN A MOBILE COMMUNICATIONS NETWORK

(75) Inventors: Jing Xiu Liu, Beijing (CN); Peter Skov, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/391,795

(22) PCT Filed: Apr. 12, 2012

(86) PCT No.: PCT/CN2012/073893
§ 371 (c)(1),
(2), (4) Date: Oct. 10, 2014

(87) PCT Pub. No.: WO2013/152490
PCT Pub. Date: Oct. 17, 2013

(65) Prior Publication Data
US 2015/0080046 A1    Mar. 19, 2015

(51) Int. Cl.
*H04W 4/08* (2009.01)
*H04B 7/06* (2006.01)
*H04W 16/28* (2009.01)
*H04B 7/04* (2006.01)

(52) U.S. Cl.
CPC .............. *H04W 4/08* (2013.01); *H04B 7/0617* (2013.01); *H04W 16/28* (2013.01); *H04B 7/0452* (2013.01)

(58) Field of Classification Search
CPC .. H04B 7/0617; H04B 7/0456; H04B 7/0626; H04B 7/0469; H04W 16/28; H04W 24/10; H04W 72/0413; H04W 4/08
See application file for complete search history.

(56) References Cited

U.S. PATENT DOCUMENTS

| | | | |
|---|---|---|---|
| 7,505,397 B2 | 3/2009 | Lee et al. ................. | 370/208 |
| 2004/0229651 A1 | 11/2004 | Hulkkonen et al. | |
| 2005/0272472 A1 | 12/2005 | Goldberg et al. | |
| 2013/0194950 A1* | 8/2013 | Haghighat ............ | H04W 24/02 370/252 |
| 2013/0235807 A1* | 9/2013 | Lee ........................ | H04W 16/28 370/329 |
| 2014/0248888 A1* | 9/2014 | Roessel ................. | H04W 16/28 455/450 |

(Continued)

FOREIGN PATENT DOCUMENTS

| | | |
|---|---|---|
| CN | 1998211 A | 7/2007 |
| CN | 101635950 A | 1/2010 |

(Continued)

*Primary Examiner* — Bobbak Safaipour
(74) *Attorney, Agent, or Firm* — Harrington & Smith

(57) ABSTRACT

Radio conditions of a user equipment in a sector of a mobile communications network are detected and the user equipment is allocated to a group of several groups of user equipments based on the radio conditions of the user equipment. The several groups include a first group of user equipments applying user equipment-specific horizontal beamforming and sector-specific vertical beamforming, a second group of user equipments applying user equipment-specific vertical beamforming and sector-specific horizontal beamforming, and a third group of user equipments applying user equipment-specific vertical beamforming and user equipment-specific horizontal beamforming. When the user equipment acquires a signaling message including a measurement set of reference signal ports for obtaining channel state information from the user equipment, it identifies an allocation scheme of the reference signal ports in the measurement set and generates the channel state information based on the measurement set using the allocation scheme.

20 Claims, 3 Drawing Sheets

(56) References Cited

U.S. PATENT DOCUMENTS

2015/0180557 A1* 6/2015 Kim .................. H04B 7/0456 375/267
2015/0180628 A1* 6/2015 Kim .................. H04B 7/0667 370/336

FOREIGN PATENT DOCUMENTS

CN 102412885 A 4/2012
WO WO2011/017953 2/2011

* cited by examiner ns as defined in the appended claims. The invention may
THREE-DIMENSIONAL BEAMFORMING IN A MOBILE COMMUNICATIONS NETWORK

BACKGROUND OF THE INVENTION

1. Field of the Invention

The present invention relates to three-dimensional beamforming in a mobile communications network. In particular, the invention relates to acquiring channel information for three-dimensional beamforming in a mobile communications network.

2. Related background Art

The following meanings for the abbreviations used in this specification apply:
3-D three-dimensional
AAS active antenna system
CQI channel quality indicator
CSI channel state information
eNB evolved node B
HSPA high speed packet access
LTE long-term evolution
PHY physical layer
PMI preceding matrix indicator
RI rank indicator
RRM radio resource management
RS reference signal
SON self organizing network
UE user equipment
VoIP voice over internet protocol The uplink feedback channel usually is a bottleneck for system performance in a mobile communications network. Efficient feedback schemes are needed to cope with an increased quantity of channel information with respect to lower resource usage and finer granularity of CSI knowledge at a base station, e.g. an eNB, of an access network of the mobile communications network. In this respect, introduction of UE-specific beamforming is a challenge to optimize feedback design.

The active antenna system (AAS) as a part of SON has provided significant gain effects by the use of optimized cell-specific downtilting. With the evolution of AAS, 3-D beamforming can be supported with either UE-specific or cell-specific beamforming, which is assumed to provide even greater gain effects.

Current 2-D beamforming creates horizontal beam oriented specific UEs. Methods to calculate a beamforming weighting vector are rather different among different candidate schemes, and a major implementation is an uplink channel estimation or feedback from UEs to obtain a channel response matrix and a downlink beam weighting vector calculation. The channel response matrix calculation costs lots of baseband processing resources and introduces delay, since the matrix has a size of NR×NT, where NR is the number of receiver antenna elements at a UE and NT is the number of transmitter antenna elements at an eNB in the horizontal domain.

When AAS with 3-D beamforming is introduced, the channel response matrix has a size of NR×NT_Horizontal× NT_Vertical, where NT_Horizontal is the number of horizontal transmitter antenna elements and NT_Vertical is the number of vertical transmitter antenna elements. In this case, the calculation of a 3-D beamforming weighting vector is very complex.

SUMMARY OF THE INVENTION

The present invention aims at reducing baseband complexity for calculations involved with 3-D beamforming.

This is achieved at least in part by the methods and apparatuses as defined in the appended claims. The invention may also be implemented by a computer program product.

A benefit of at least one embodiment of the invention is to reduce the baseband complexity to calculate 3-D beamforming with a very slight additional implementation effort and only a very slight performance drop.

In the following the invention will be described by way of embodiments thereof with reference to the accompanying drawings.

DESCRIPTION OF THE EMBODIMENTS

According to an embodiment of the invention, UEs in a sector of a mobile communications network in which a radio access network adopts 3-D beamforming, are grouped into three categories:

Group 1: UEs allocated to this group apply UE-specific horizontal beamforming and sector-specific vertical beamforming;

Group 2: UEs allocated to this group apply UE-specific vertical beamforming and sector-specific horizontal beamforming; and Group 3: UEs allocated to this group apply UE-specific vertical beamforming and UE-specific horizontal beamforming.

There may be different criterions to categorize all the UEs into the above three groups. A first criterion (criterion 1) may be based on large scale fading, e.g. pathloss. For example, cell-edge UEs are allocated to Group 1, cell-center UEs are allocated to Group 2, and cell-middle UEs are allocated to Group 3.

A second criterion (criterion 2) may be based on traffic types. For example, UEs with a continuous large amount data transmission, e.g. file download, are allocated to Group 3, and UEs with traffic with large transmission intervals, e.g. VoIP, are allocated to Group 1 or Group 2.

Figures 1A, 1B:
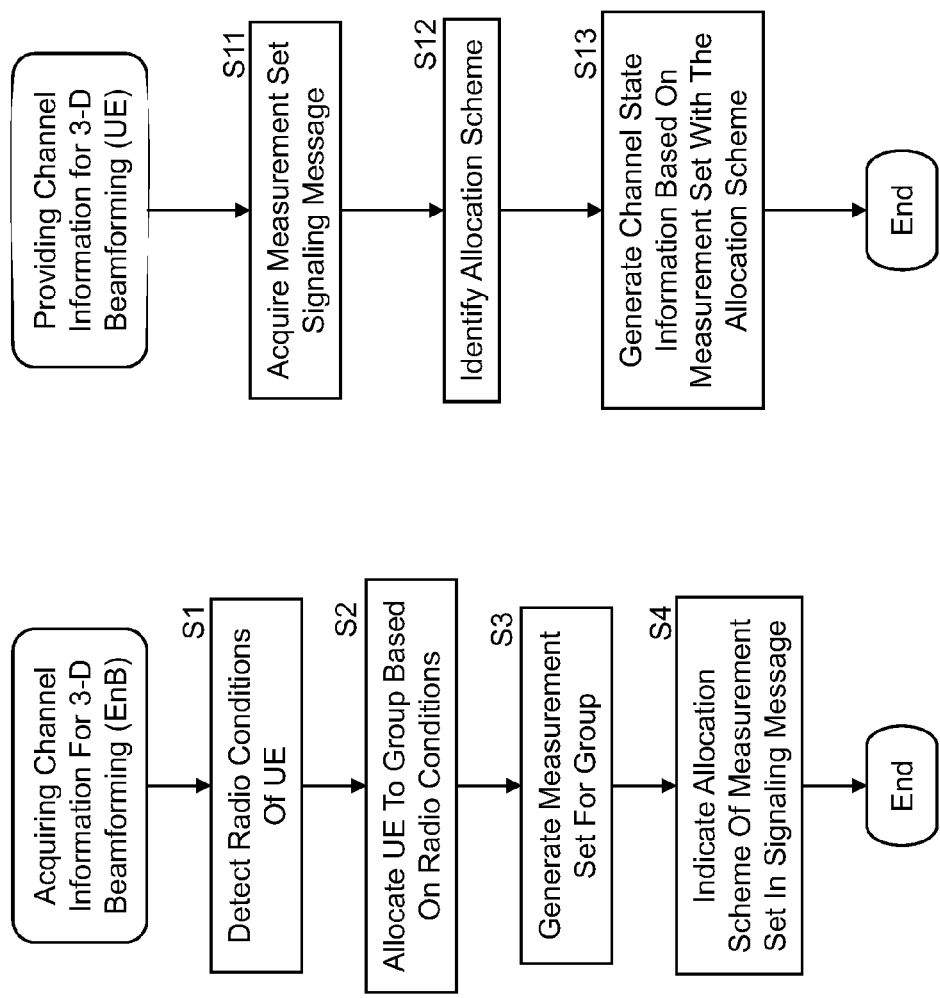
FIGS. 1A and 1B show flowcharts illustrating procedures of acquiring/providing channel information for 3-D beamforming according to an embodiment of the invention.

FIG. 1A shows a flowchart illustrating a procedure of acquiring channel information for 3-D beamforming according to an embodiment of the invention. The procedure may be performed by a base station of a radio access network of the mobile communications network, e.g. an eNB.

In a step S1, radio conditions of a user equipment in a sector of the mobile communications network are detected. The radio conditions may include large scale fading, traffic types and speed information.

In step S2, the user equipment is allocated to a group of several groups of user equipments based on the radio conditions of the user equipment. The several groups comprise a first group (Group 1) of user equipments applying user equipment-specific horizontal beamforming and sector-specific vertical beamforming, a second group (Group 2) of user equipments applying user equipment-specific vertical beamforming and sector-specific horizontal beamforming, and a third group (Group 3) of user equipments applying user equipment-specific vertical beamforming and user equipment-specific horizontal beamforming. The several groups are not limited to the first to third groups and may further comprise a fourth group of user equipments applying sector-specific vertical beamforming and sector-specific horizontal beamforming.

When the radio conditions include large scale fading, the eNB may detect whether the user equipment is located at an edge of a cell of the mobile communications network, in the center of the cell or in the middle of the cell, and allocate the user equipment accordingly. In particular, the user equipment may be allocated to the first group when it is detected to be located at the edge of the cell, allocated to the second group when it is detected to be located in the center of the cell, and allocated to the third group when it is detected to be located in the middle of the cell.

When the radio conditions include traffic types, the eNB may detect whether traffic of the user equipment involves a continuous transmission of a large data amount, or large transmission intervals, and allocate the user equipment accordingly. In particular, the user equipment may be allocated to the third group when its traffic is detected to involve the continuous transmission, and allocated to the first group or the second group when its traffic is detected to involve the large transmission intervals.

For implementing the above procedure in the eNB, regarding RRM, a module is provided to collect necessary information and allocate UEs into different groups. The different groups corresponds to different precoding/beamforming schemes with different complexity. Further, link adaptation at the eNB requires information on the allocated group for CQI update with correct beamforming information, e.g. either 3-D UE-specific beamforming or 2-D UE-specific beamforming in the horizontal or vertical direction.

Regarding a PHYS parameter configuration for implementing the above procedure, this is dependent on CSI-RS configuration methods.

Referring again to FIG. 1A, in step S3 a measurement set of reference signal ports, e.g. CSI-RS ports, may be generated for the group, for obtaining channel state information from the user equipment. In step S4, an indication of a feedback direction may be included into a message signaling the measurement set to the user equipment.

The measurement set (first type measurement set) may be generated by allocating n horizontal reference signal ports for N horizontal antenna elements of a transmitter and m vertical reference signal ports for M vertical antenna elements of the transmitter such that n×m reference signal ports are included in the measurement set, wherein N and M are integers greater than one, and n and m are integers greater than one and equal to or less than N and M, respectively.

Alternatively or in addition, the measurement set (second type measurement set) may be generated by allocating k vertical reference signal ports for N horizontal antenna elements and M vertical antenna elements such that 1×k reference signal ports are included in the measurement set, wherein k is an integer greater than one and equal to or less than M.

Further alternatively or in addition, the measurement set (third type measurement set) may be generated by allocating j horizontal reference signal ports for the N horizontal antenna elements and the M vertical antenna elements such that j×1 reference signal ports are included in the measurement set, wherein j is an integer greater than one and equal to or less than N.

The measurement set of the first type may be generated for the third group, the measurement set of the second type may be generated for the second group, and the measurement set of the third type may be generated for the first group.

Alternatively, the first type may be generated for the first to third groups with the feedback direction indicated in the signaling message.

FIG. 1B shows a flowchart illustrating a procedure of providing channel information for 3-D beamforming according to the embodiment of the invention from a view point of the user equipment.

In step S11, the user equipment acquires the signaling message which includes the measurement set for obtaining the channel state information from the user equipment, as described above. In step S12, the user equipment identifies an allocation scheme of the reference signal ports in the measurement set, and in step S13 generates the channel state information based on the measurement set using the allocation scheme. In case the signaling message includes an indication of a feedback direction, the user equipment generates the channel state information with respect to the feedback direction.

In the following, an implementation example of the invention will be described by referring to FIGS. 2A to 2C.

Figure 2C:
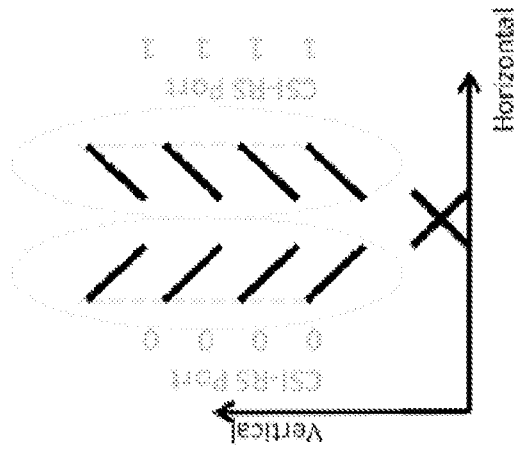
FIGS. 2A, 2B and 2C show diagrams illustrating CSI-RS port configurations according to an implementation example of the invention.
Figure 2B:
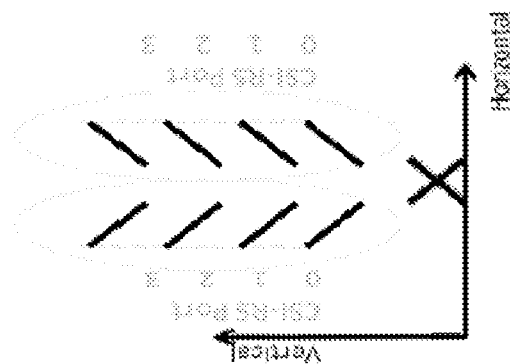
Figure 2A:
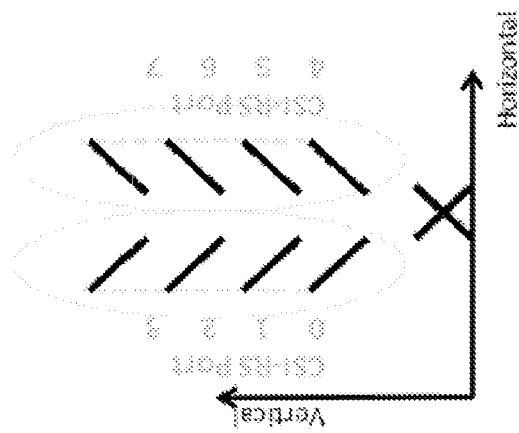

FIG. 2A shows a CSI-RS configuration in which CSI-RS ports are allocated to cover both horizontal and vertical antenna elements simultaneously and all the CSI-RS ports are in the measurement set signaled to UEs. In other words, this CSI-RS configuration is used for the first to third groups. As illustrated in FIG. 2A, there are two horizontal antenna elements (i.e. N=2) and each of them is composed by four vertical antenna elements (i.e. M=4). CSI_RS ports 0~3 are configured for +45 degree slant and CSI_RS ports 4~7 are configured for −45 degree slant (i.e. n=2, m=4). All CSI-RS ports 0~7 are configured as the measurement set to all the UEs.

In this case, an indication of the allocation scheme may be provided in the message signaling the measurement set to the UEs. For this purpose, two bits may be introduced in the signaling configuring CQI/PMI/RI, to indicate whether only UE-specific PMI for the horizontal direction needs to be fed back, or only for the vertical direction, or for both directions.

An alternative CSI-RS port configuration comprises less CSI-RS ports, and CSI-RS ports for vertical antenna elements and CSI-RS ports for horizontal antenna elements are with sector beamformed by horizontal sector beam and vertical sector beam separately. In FIG. 2B, CSI-RS ports in the vertical domain are beamformed with sector beam in horizontal direction and vice verse in FIG. 2C.

In other words, in FIG. 2B there are two horizontal antenna elements (i.e. N=2) and each of them is composed by four vertical antenna elements (i.e. M=4). CSI_RS ports 0~3 are configured for +45 degree slant and CSI_RS ports 0~3 are configured for −45 degree slant (i.e. k=4). Only CSI-RS ports 0~3 are configured as the measurement set.

In FIG. 2C there are two horizontal antenna elements (i.e. N=2) and each of them is composed by four vertical antenna elements (i.e. M=4). CSI_RS port 0 is configured for +45 degree slant and CSI_RS port 1 is configured for −45 degree slant (i.e. j=2). Only CSI-RS ports 0~1 are configured as the measurement set.

So CSI-RS ports with a configuration as shown in FIG. 2B may be allocated to UEs in Group 2 with sector-specific horizontal beamforming and UE-specific vertical beamforming. CSI-RS ports with a configuration as shown in FIG. 2C may allocated to UEs in Group 1 with sector-specific vertical beamforming and UE-specific horizontal beamforming. CSI-RS ports with a configuration shown in FIG. 2A may be allocated to UEs in Group 3 with UE-specific both horizontal and vertical beamforming. With the alternative CSI-RS port configuration no additional signaling is needed.

The major benefit of this invention is a reduction of baseband complexity to calculate 3-D beamforming with a very slight additional implementation effort and only a very slight performance drop. This is because, based on test results, beamforming gain is present at the cell edge, and a vertical angle change for cell-edge UEs is very small, so that sector-specific vertical beamforming for cell edge UEs has a performance very close to an ideal UE-specific vertical beam.

Moreover, for UEs very close to the eNB, a position change and channel response has a great impact especially in the vertical direction. Hence, a channel response change in the vertical direction is the majority in the overall channel variation, so only UE-specific vertical beamforming is appropriate.

In addition, for UEs in the middle of the cell for which a position change in both directions has a great impact, UE-specific 3-D beamforming can reflect this appropriately.

Regarding traffic types, for traffic arrival with large intervals, accurate channel tracking is impossible especially for both horizontal and vertical directions simultaneously. Hence, tracking the channel in only one direction is appropriate.

Figure 3:
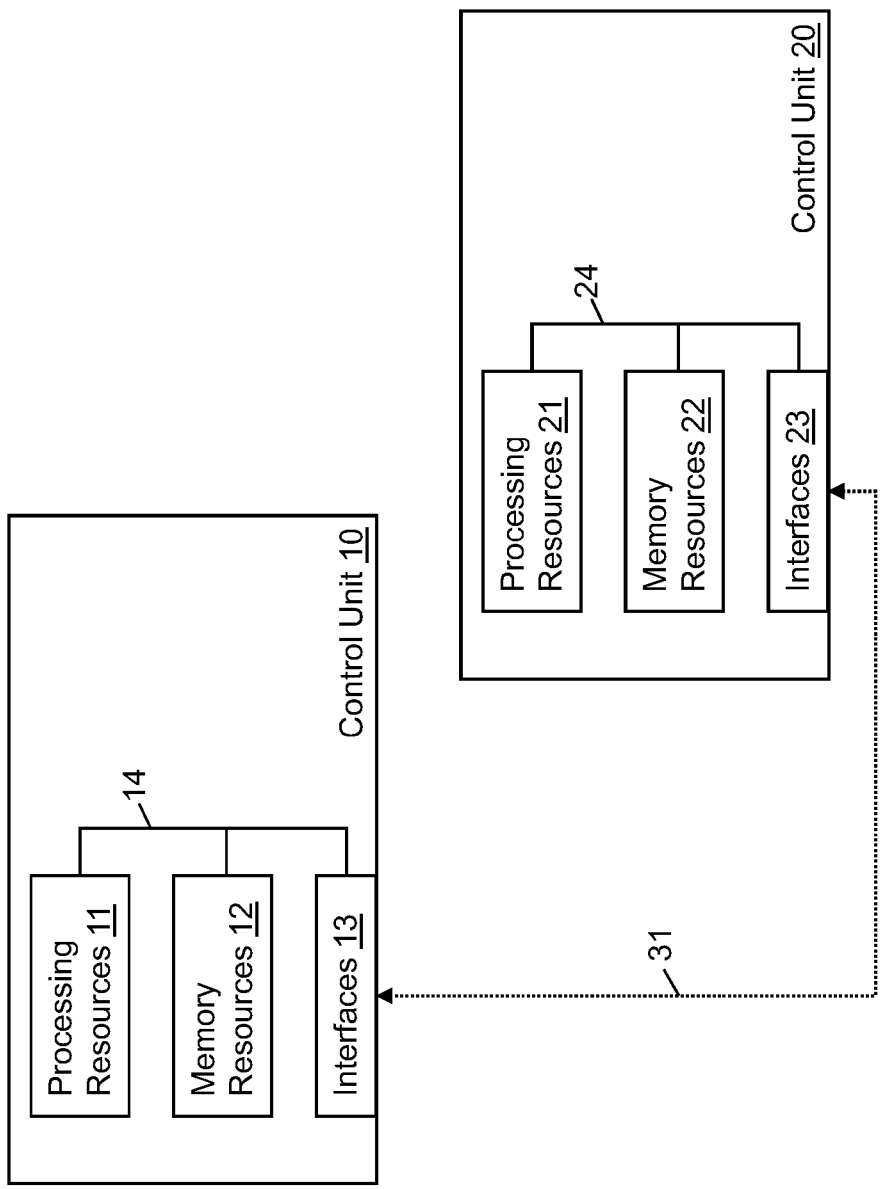
FIG. 3 shows a simplified block diagram of various electronic devices that are suitable for use in practicing the exemplary embodiments of this invention.

Now reference is made to FIG. 3 for illustrating a simplified block diagram of various electronic devices that are suitable for use in practicing the exemplary embodiments of this invention.

A control unit 10 includes processing resources 11, memory resources 12 and interfaces 13 which are coupled via a link 14. The memory resources 12 may store a program. The control unit 10 is coupled via its interfaces 13 through a wireless link 31 to a control unit 20. The control unit 10 may be part of or used by a base station of a radio access network, e.g. an eNB. Using its processing resources 11, memory resources 12 and interfaces 13, the control unit 10 may perform the procedure shown in FIG. 1A.

The control unit 20 includes processing resources 21, memory resources 22 and interfaces 23 which are coupled via a link 24. The memory resources 22 may store a program. The control unit 20 is coupled via its interfaces 23 through the wireless link 31 to the control unit 10. The control unit 20 may be part of or used by a user equipment. Using its processing resources 21, memory resources 22 and interfaces 23, the control unit 20 may perform the procedure shown in FIG. 1B.

The interfaces 13, 23 may include a suitable radio frequency (RF) transceiver coupled to antennas (not shown) for bidirectional wireless communications over the wireless link 31.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory resources 12, 22 may include instructions that, when executed by the associated processing resources 11, 21, enable the electronic device to operate in accordance with the exemplary embodiments of this invention, as detailed above. Inherent in the processing resources 11, 21 is a clock to enable synchronism among the various apparatus for transmissions and receptions within the appropriate time intervals and slots required, as the scheduling grants and the granted resources/subframes are time dependent. The transceivers included in the interfaces 13, 23 include both transmitter and receiver, and inherent in each is a modulator/demodulator commonly known as a modem.

In general, the exemplary embodiments of this invention may be implemented by computer software stored in the memory resources 12, 22 and executable by the processing resources 11, 21, or by hardware, or by a combination of software and/or firmware and hardware in any or all of the devices shown.

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22 may be of any type suitable to the local technical environment and may be implemented using any suitable data storage technology, such as semiconductor-based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus, e.g. a base station of a radio access network, comprises means for detecting radio conditions of a user equipment in a sector of a mobile communications network, and means for allocating the user equipment to a group of several groups of user equipments based on the radio conditions of the user equipment, the several groups comprising a first group of user equipments applying user equipment-specific horizontal beamforming and sector-specific vertical beamforming, a second group of user equipments applying user equipment-specific vertical beamforming and sector-specific horizontal beamforming, and a third group of user equipments applying user equipment-specific vertical beamforming and user equipment-specific horizontal beamforming.

The several groups may further comprise a fourth group of user equipments applying sector-specific vertical beamforming and sector-specific horizontal beamforming.

The apparatus may further comprise means for generating a measurement set for the group, for obtaining channel state information from the user equipment, the measurement set including reference signal ports.

The radio conditions may include at least one of large scale fading, traffic types and speed information.

The means for detecting, when the radio conditions include large scale fading, may detect whether the user equipment is located at an edge of a cell of the mobile communications network, in the center of the cell or in the middle of the cell, and the means for allocating may allocate the user equipment to the first group, when it is detected to be located at the edge of the cell, allocate the user equipment to the second group when it is detected to be located in the center of the cell, and allocate the user equipment to the third group when it is detected to be located in the middle of the cell.

The means for detecting, when the radio conditions include traffic types, may detect whether traffic of the user equipment involves a continuous transmission of a large data amount, or large transmission intervals, and the means for allocating may allocate the user equipment to the third group when its traffic is detected to involve the continuous transmission, and allocate the user equipment to the first group or the second group when its traffic is detected to involve the large transmission intervals.

The means for generating may generate a first type of the measurement set by allocating n horizontal reference signal ports for N horizontal antenna elements of a transmitter and m vertical reference signal ports for M vertical antenna elements of the transmitter such that n×m reference signal ports are included in the measurement set, wherein N and M are integers greater than one, and n and m are integers greater than one and equal to or less than N and M, respectively, and/or generate a second type of the measurement set by allocating k vertical reference signal ports for the N horizontal antenna elements and the M vertical antenna elements such that 1×k reference signal ports are included in the measurement set, wherein k is an integer greater than one and equal to or less than M, and/or generate a third type of the measurement set by allocating j horizontal reference signal ports for the N horizontal antenna elements and the M vertical antenna elements such that j×1 reference signal ports are included in the measurement set, wherein j is an integer greater than one and equal to or less than N.

The means for generating may generate the measurement set of the first type for each of the first to third groups and include an indication of a requested feedback direction for the measurement set into a message signaling the measurement set to the user equipment, or generate the measurement set of the first type for the third group and generate the measurement set of the second type for the second group and generate the measurement set of the third type for the first group.

The means for detecting, allocating and generating may be implemented by the processing resources 11, memory resources 12 and interfaces 13 of the control unit 10 shown in FIG. 3.

According to an aspect of the invention, a user equipment located in a sector of a mobile communications network comprises means for acquiring a signaling message including a measurement set of reference signal ports for obtaining channel state information from the user equipment, means for identifying an allocation scheme of the reference signal ports in the measurement set, and means for generating the channel state information based on the measurement set using the allocation scheme of the reference signal ports.

When the signaling message includes an indication of a feedback direction, the means for generating may generate the channel state information with respect to the feedback direction.

The acquiring, identifying and generating means may be implemented by the processing resources 21, memory resources 22 and interfaces 23 of the control unit 20 shown in FIG. 3.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method comprising:
    detecting radio conditions of a user equipment in a sector of a mobile communications network; and
    allocating the user equipment to a group of several groups of user equipment based on the radio conditions of the user equipment, the several groups comprising a first group of user equipment applying user equipment-specific horizontal beamforming and sector-specific vertical beamforming, a second group of user equipment applying user equipment-specific vertical beamforming and sector-specific horizontal beamforming, and a third group of user equipment applying user equipment-specific vertical beamforming and user equipment-specific horizontal beamforming.

2. The method of claim 1, wherein the several groups comprise a fourth group of user equipment applying sector-specific vertical beamforming and sector-specific horizontal beamforming.

3. The method of claim 1, comprising:
    generating a measurement set for the group, for obtaining channel state information from the user equipment, the measurement set including reference signal ports.

4. The method of claim 1, wherein the radio conditions include at least one of large scale fading, traffic types and speed information.

5. The method of claim 4, comprising:
    detecting, when the radio conditions include large scale fading, whether the user equipment is located at an edge of a cell of the mobile communications network, in the center of the cell or in the middle of the cell; and
    allocating the user equipment to the first group, when it is detected to be located at the edge of the cell, allocating the user equipment to the second group when it is detected to be located in the center of the cell, and allocating the user equipment to the third group when it is detected to be located in the middle of the cell.

6. The method of claim 4, comprising:
    detecting, when the radio conditions include traffic types, whether traffic of the user equipment involves a continuous transmission of a large data amount, or large transmission intervals; and
    allocating the user equipment to the third group when its traffic is detected to involve the continuous transmission, and allocating the user equipment to the first group or the second group when its traffic is detected to involve the large transmission intervals.

7. The method of claim 3, comprising:
    generating a first type of the measurement set by allocating n horizontal reference signal ports for N horizontal antenna elements of a transmitter and m vertical reference signal ports for M vertical antenna elements of the transmitter such that n×m reference signal ports are included in the measurement set, wherein N and M are integers greater than one, and n and m are integers greater than one and equal to or less than N and M, respectively, and/or
    generating a second type of the measurement set by allocating k vertical reference signal ports for the N horizontal antenna elements and the M vertical antenna elements such that 1×k reference signal ports are included in the measurement set, wherein k is an integer greater than one and equal to or less than M, and/or
    generating a third type of the measurement set by allocating j horizontal reference signal ports for the N horizontal antenna elements and the M vertical antenna elements such that j×l reference signal ports are included in the measurement set, wherein j is an integer greater than one and equal to or less than N.

8. The method of claim 7, comprising:
generating the measurement set of the first type for each of the first to third groups and including an indication of a requested feedback direction for the measurement set into a message signaling the measurement set to the user equipment; or
generating the measurement set of the first type for the third group, and
generating the measurement set of the second type for the second group, and
generating the measurement set of the third type for the first group.

9. An apparatus comprising:
at least one processor; and
at least one memory including computer program code, where the at least one memory including the computer program code is configured, with the at least one processor, to cause the apparatus to at least:
detect radio conditions of a user equipment in a sector of a mobile communications network; and
allocate the user equipment to a group of several groups of user equipment based on the radio conditions of the user equipment, the several groups comprising a first group of user equipment applying user equipment-specific horizontal beamforming and sector-specific vertical beamforming, a second group of user equipment applying user equipment-specific vertical beamforming and sector-specific horizontal beamforming, and a third group of user equipment applying user equipment-specific vertical beamforming and user equipment-specific horizontal beamforming.

10. The apparatus of claim 9, wherein the several groups comprise a fourth group of user equipment applying sector-specific vertical beamforming and sector-specific horizontal beamforming.

11. The apparatus of claim 9, wherein the at least one memory including the computer program code is configured with the at least one processor to cause the apparatus to:
generate a measurement set for the group, for obtaining channel state information from the user equipment, the measurement set including reference signal ports.

12. The apparatus of claim 9, wherein the radio conditions include at least one of large scale fading, traffic types and speed information.

13. The apparatus of claim 12, wherein the at least one memory including the computer program code is configured with the at least one processor to cause the apparatus to:
detect, when the radio conditions include large scale fading, whether the user equipment is located at an edge of a cell of the mobile communications network, in the center of the cell or in the middle of the cell; and
allocate the user equipment to the first group, when it is detected to be located at the edge of the cell, allocate the user equipment to the second group when it is detected to be located in the center of the cell, and allocate the user equipment to the third group when it is detected to be located in the middle of the cell.

14. The apparatus of claim 12, wherein the at least one memory including the computer program code is configured with the at least one processor to cause the apparatus to:
detect, when the radio conditions include traffic types, whether traffic of the user equipment involves a continuous transmission of a large data amount, or large transmission intervals; and
allocate the user equipment to the third group when its traffic is detected to involve the continuous transmission, and allocate the user equipment to the first group or the second group when its traffic is detected to involve the large transmission intervals.

15. The apparatus of claim 11, wherein the at least one memory including the computer program code is configured with the at least one processor to cause the apparatus to:
generate a first type of the measurement set by allocating n horizontal reference signal ports for N horizontal antenna elements of a transmitter and m vertical reference signal ports for M vertical antenna elements of the transmitter such that n×m reference signal ports are included in the measurement set, wherein N and M are integers greater than one, and n and m are integers greater than one and equal to or less than N and M, respectively, and/or
generate a second type of the measurement set by allocating k vertical reference signal ports for the N horizontal antenna elements and the M vertical antenna elements such that l×k reference signal ports are included in the measurement set, wherein k is an integer greater than one and equal to or less than M, and/or
generate a third type of the measurement set by allocating j horizontal reference signal ports for the N horizontal antenna elements and the vertical antenna elements such that j×l reference signal ports are included in the measurement set, wherein j is an integer greater than one and equal to or less than N.

16. The apparatus of claim 15, wherein the at least one memory including the computer program code is configured with the at least one processor to cause the apparatus to:
generate the measurement set of the first type for each of the first to third groups and include an indication of a requested feedback direction for the measurement set into a message signaling the measurement set to the user equipment; or
generate the measurement set of the first type for the third group, and
generate the measurement set of the second type for the second group, and
generate the measurement set of the third type for the first group.

17. A non-transitory computer readable medium storing a program of instructions, execution of which by a processor configures an apparatus to at least:
detecting radio conditions of a user equipment in a sector of a mobile communications network; and
allocating the user equipment to a group of several groups of user equipment based on the radio conditions of the user equipment, the several groups comprising a first group of user equipment applying user equipment-specific horizontal beamforming and sector-specific vertical beamforming, a second group of user equipment applying user equipment-specific vertical beamforming and sector-specific horizontal beamforming, and a third group of user equipment applying user equipment-specific vertical beamforming and user equipment-specific horizontal beamforming.

18. The non-transitory computer readable medium storing a program of instructions of claim 17, wherein the several groups comprise a fourth group of user equipment applying sector-specific vertical beamforming and sector-specific horizontal beamforming.

19. The non-transitory computer readable medium storing a program of instructions of claim 17, comprising:

generating a measurement set for the group, for obtaining channel state information from the user equipment, the measurement set including reference signal ports.

20. The non-transitory computer readable medium storing a program of instructions of claim 17, wherein the radio conditions include at least one of large scale fading, traffic types and speed information.

* * * * *